United States Patent
Rollini et al.

(10) Patent No.: US 12,007,879 B2
(45) Date of Patent: Jun. 11, 2024

(54) AUTOMATED TEST VECTOR GENERATION

(71) Applicant: Rosemount Aerospace Inc., Burnsville, MN (US)

(72) Inventors: Simone Fulvio Rollini, Rome (IT); Rob C. North, Ferrisburgh, VT (US)

(73) Assignee: Rosemount Aerospace Inc., Burnsville, MN (US)

( * ) Notice: Subject to any disclaimer, the term of this patent is extended or adjusted under 35 U.S.C. 154(b) by 143 days.

(21) Appl. No.: 17/504,111

(22) Filed: Oct. 18, 2021

(65) Prior Publication Data

US 2022/0121559 A1    Apr. 21, 2022

(30) Foreign Application Priority Data

Oct. 20, 2020   (EP) ................................... 20202801

(51) Int. Cl.
    *G06F 11/30*      (2006.01)
    *G06F 11/34*      (2006.01)
    *G06F 11/36*      (2006.01)

(52) U.S. Cl.
    CPC ...... *G06F 11/3684* (2013.01); *G06F 11/3447* (2013.01); *G06F 11/3688* (2013.01); *G06F 11/3692* (2013.01)

(58) Field of Classification Search
    CPC ............. G06F 11/3608; G06F 11/3684; G06F 11/3688; G06F 11/3692; G06F 11/3447
    See application file for complete search history.

(56) References Cited

U.S. PATENT DOCUMENTS

| | | | | |
|---|---|---|---|---|
| 7,644,398 | B2* | 1/2010 | Cleaveland | G06F 11/3684 717/124 |
| 9,098,619 | B2* | 8/2015 | Bhatt | G06F 11/3608 |
| 10,108,536 | B2* | 10/2018 | Li | G06F 11/3684 |
| 10,346,140 | B2* | 7/2019 | Johnson | G06F 8/35 |
| 11,327,874 | B1* | 5/2022 | Klein | G06F 11/3692 |
| 2003/0135802 | A1* | 7/2003 | Klein | G06F 30/33 714/725 |
| 2010/0175052 | A1* | 7/2010 | Prasad | G06F 11/3684 717/128 |
| 2018/0113796 | A1* | 4/2018 | Meyers | G06F 11/00 |
| 2019/0179733 | A1* | 6/2019 | Lyberis | G06F 11/368 |

FOREIGN PATENT DOCUMENTS

| | | |
|---|---|---|
| EP | 3032425 A1 | 6/2016 |
| WO | 2010018415 A1 | 2/2010 |
| WO | WO-2018007822 A1 * | 1/2018 .......... G06F 11/3608 |

OTHER PUBLICATIONS

Extended European Search Report for European Patent Application No. 20202801.5, dated Apr. 13, 2021, 10 pages.

* cited by examiner

*Primary Examiner* — Hanh Thi-Minh Bui
(74) *Attorney, Agent, or Firm* — Kinney & Lange, P.A.

(57) ABSTRACT

An algorithm and method for automatically generating test vectors for an LRU by deriving test vectors at the LRU boundary that, when simulated on the LRU, reproduce input and output of given test cases at the boundary of the individual requirements, and for knowing whether there are test cases that cannot be realised, i.e. test vectors cannot be derived at the LRU boundary to reproduce them at the boundary of individual requirements.

10 Claims, 1 Drawing Sheet

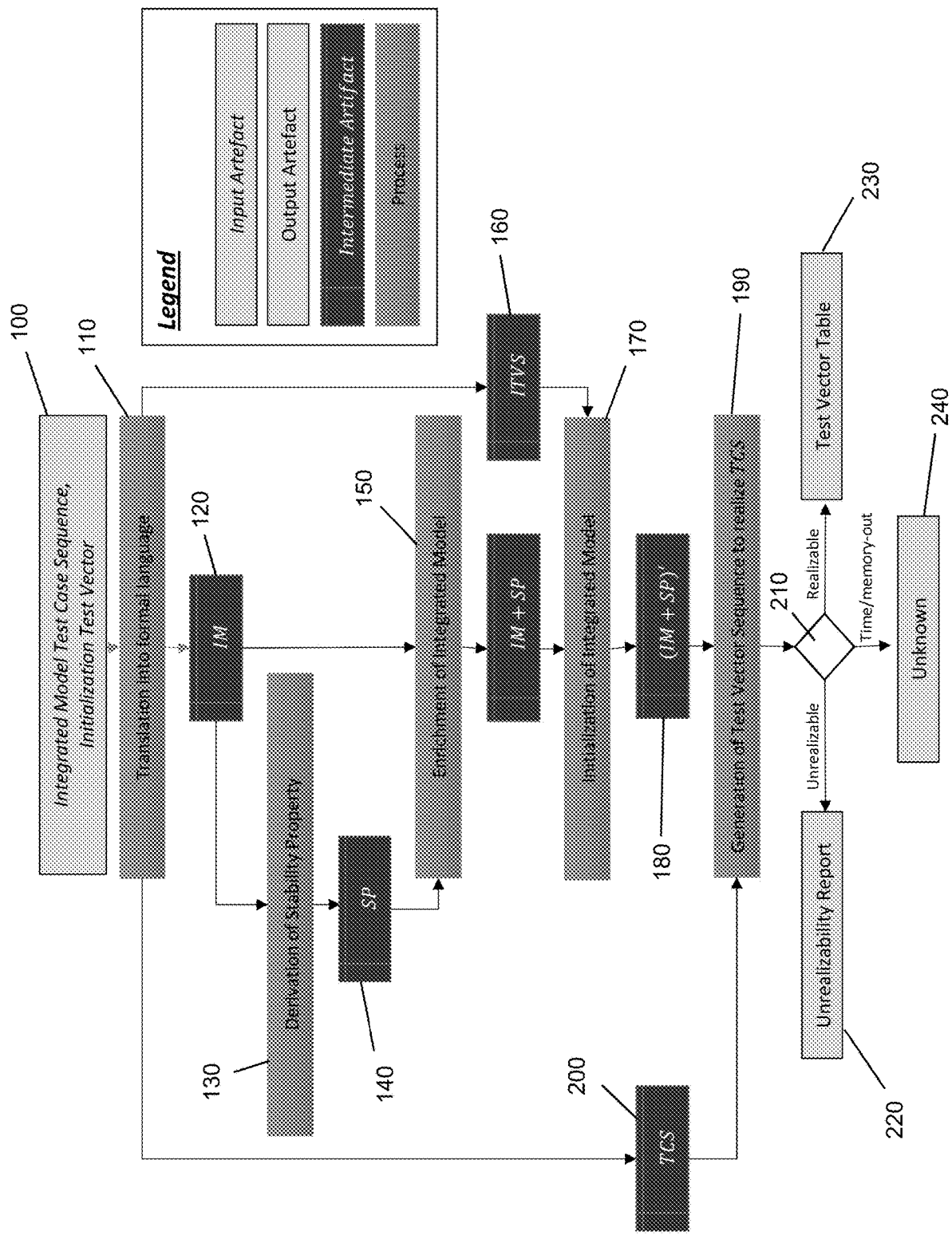

AUTOMATED TEST VECTOR GENERATION

TECHNICAL FIELD

The present disclosure is concerned with model-based testing of software.

BACKGROUND

When developing software, testing needs to be performed during the development stage to determine whether the software actually performs the desired functions. The most basic form of testing is to create the software by trial and error, i.e. to create a program based on a set of high level requirements and then test it in the environment for which it is designed and then re-design as required based on the test results in an iterative manner. This is, of course, time consuming, especially where the real-life environment for testing the software is not easily accessible for testing purposes such as in the field of software for aerospace applications. Automated testing procedures have been developed to increase the efficiency of software design. Typically, in many fields, model-based testing is used.

Model-based software development and verification involves, first, specifying high level requirements—i.e. defining in simple terms what the software is intended to do or achieve. These high level requirements can be defined in the form of models which can be tested and verified on the basis of a created control model. The verified models are then converted into source code. The models are used to generate a test suite using a formal reasoning engine.

In simple terms, in model-based software development, the designer may create models by using a standard modelling language that expresses information in a structure that is defined by a consistent set of rules. Requirements and specifications of the software are thus represented by models which enables automated analysis, source code generation and verification.

In developing software for the aerospace industry, for example, a model-based standard DO-331 defines how models can be used to represent high-level requirements (specification models) and low-level requirements (design models). Such model-based software development is now common in the aerospace and many other fields.

Once the high-level software requirements have been captured in specification models, they can be used to generate test cases.

Individual programs are often intended for use in combination with other programs and hardware and testing individual programs will not necessarily give an indication of how those programs will function in combination with the other programs and software in the environment for which they are intended.

Conventionally, individual specification models (i.e. individual programs for individual requirements) will be generated and tested as individual blocks and these will then be combined into a combination of blocks as an LRU model representing the overall system. A dedicated LRU test rig is then used to verify the correct implementation of the various models in combination.

The conventional method of testing assumes the LRU to be in a target initial state by means of an initialisation sequence i.e. a sequence of input assignments—a test vector sequence—at the boundary of the LRU.

Since, however, the controllable inputs and observable outputs at the various components of the LRU may not necessarily correspond to the boundaries of the individual specification models when they were tested, (as they would have been tested in isolation from the other parts of the system with which they are, in the LRU, integrated) it is necessary to find a way to manipulate the primary inputs to the LRU such that, moving from an initial state, the sequence of input assignments corresponding to a requirement test case is received at the boundary of that requirement and the actual requirement output can be verified to be equal to the expected test case output. The way in which the requirements interact within the LRU determines which input/output sequences can be observed at a requirement boundary (i.e. are realisable) and which cannot.

There is a need for an improved manner of reliably testing individual requirements in the context of an LRU by deriving test vectors at the LRU boundary that, when simulated on the LRU, reproduce input and output of given test cases at the boundary of the individual requirements, and for knowing whether there are test cases that cannot be realised, i.e. test vectors cannot be derived at the LRU boundary to reproduce them at the boundary of individual requirements.

SUMMARY

According to one aspect, there is provided a method of generating a test vector sequence for an integrated model including individual requirement software models and hardware models, the method comprising:
 translating the integrated model, a test case sequence and an initialisation test vector into a common formal language;
 deriving a stability property for each individual requirement and incorporating the derived stability properties into the translated integrated model;
 providing the translated initialisation test vector sequence to the integrated model enriched with the stability properties to drive the integrated model to an initial state; and
 generating a sequence of test vectors to realise the test case sequence.

According to a second aspect, there is provided a system for generating a test vector sequence for an integrated model including individual requirement software models and hardware models, the method comprising:
 means for translating the integrated model, a test case sequence and an initialisation test vector sequence into a common formal language;
 means for deriving a stability property for each individual requirement and incorporating the derived stability properties into the translated integrated model;
 means for providing the translated initialisation test vector sequence to the integrated model enriched with the stability properties to drive the integrated model to an initial state; and
 means for generating a sequence of test vectors to realise the test case sequence.

In an embodiment, it is also determined whether or not the test case sequence is realisable and an indication thereof may be provided.

BRIEF DESCRIPTION OF THE DRAWINGS

FIG. 1 is a flow chart showing an algorithm for deriving test vectors and for determining realisability according to embodiments of the disclosure.

DETAILED DESCRIPTION

According to the method of the present disclosure, executable specification models of high level system requirements are combined with models of hardware behaviour into a functional integrated LRU model and a sequence of test vectors is generated for the LRU model.

By having an integrated LRU model—i.e. a model that integrates the specification models and hardware models—enables an algorithm to be created to analyse the overall LRU for realisability and, where realisable, to produce a sequence of primary inputs to the LRU model that can realise each test case. This is based on the premise that for any test case, there may have been a preceding test case whose execution preceded and will affect the starting state for that test case, this leading to a test case sequence.

For the integrated model, the present disclosure provides a method that performs an initialisation sequence that brings the integrated LRU model to a known initial state and also includes generation of a test vector sequence that produces a test case sequence if the sequence of test cases is realisable.

Preferably, the method also detects and reports if the test case sequence is not realisable.

In its preferred form, as shown in FIG. 1, the method is in the form of an algorithm that:

Receives as input an integrated model, a test case sequence and an initialisation test vector sequence (step 100).

Translates the integrated model into a formal representation expressed in a formal language. The test case sequence and the initialisation test vector sequence are also translated into the formal language. (step 110)

Enriches the integrated model 120 with a stability property 140, derived from the integration model, for the target requirement as well as for requirements on which its input depends (step 150). If the stability property 140 for a requirement is satisfied then that requirement is in a stable state i.e. a state that is maintained as long as the input is maintained. Observation of the input and output of a requirement (or specification model) is considered reliable when the target requirement and the requirement(s) affecting it in the LRU are in a stable state.

Causes the formal reasoning engine to provide the initialisation test vector 160 as an input to the integrated model to drive it to the target initial state 180 (step 170).

Causes the formal reasoning engine to generate a test vector sequence from the initial state (step 190) so that the test vector sequence realises the corresponding test case sequence 200 while satisfying the stability property. If the reasoning engine determines, at 210, that a test case cannot be realised, this part of the test case sequence—i.e. from the unrealisable test case to the end of the sequence—is reported as unrealisable 220. If the test case can be realised, a test vector table is generated (step 230). Optionally, in the determination as to whether the test case is realisable, if time or memory elapses before the determination is made, a determination of 'unknown' (240) is made.

This automatic generation of test vectors results in considerable time and cost savings and reduces errors compared to manual determination of test vectors. Also, since the algorithm performs an early determination as to whether a test case is realisable or not, time and resources are not wasted. The method allows automatic generation and verification of test vectors in a virtual environment before they are executed in real life implementation on actual physical test equipment.

The invention claimed is:

1. A method for testing software for an aerospace application, the method comprising:
translating an integrated model that includes individual requirement software models and hardware models, a test case sequence, and an initialization test vector sequence into a common formal language;
deriving a stability property for each individual requirement and incorporating the derived stability properties into the translated integrated model;
providing the translated initialization test vector sequence to the translated integrated model enriched with the derived stability properties to drive the translated integrated model to an initial state;
generating a sequence of test vectors from the initial state;
determining whether the test case sequence can be realized by simulating the sequence of test vectors on the translated integrated model to reproduce inputs and outputs of the test case sequence at a boundary of the each individual requirement;
producing at least one of a test vector table comprising verified test vectors if the test case sequence can be realized or an unrealizability report if the test case sequence cannot be realized; and
executing the verified test vectors on physical test equipment.

2. The method of claim 1, further comprising:
producing an indication of an unknown status when time or memory elapses before a determination of whether the test case sequence can be realized is made.

3. The method of claim 1, further comprising:
automatically generating and verifying the test vector sequence in a virtual environment before the test vector sequence is implemented on the physical test equipment.

4. A testing method for an integrated model that includes individual requirement software models and hardware models, the method comprising:
translating the integrated model, a test case sequence and an initialization test vector sequence into a common formal language;
deriving a stability property for each individual requirement and incorporating the derived stability properties into the translated integrated model;
providing the translated initialization test vector sequence to the translated integrated model enriched with the derived stability properties to drive the translated integrated model to an initial state;
generating a sequence of test vectors from the initial state to realize the test case sequence;
determining whether the test case sequence can be realized by simulating the sequence of test vectors on the translated integrated model to reproduce inputs and outputs of the test case sequence at a boundary of the each individual requirement; and
providing an indication of whether the test case sequence can be realized.

5. A non-transitory computer storage medium having instructions stored thereon which, when performed on a modelling system, perform the method of claim 4.

6. The method of claim 4, further comprising producing a test vector table that includes verified test vectors if the test case sequence can be realized.

7. The method of claim 6, further comprising:
executing the verified test vectors on physical test equipment.

8. The method of claim 4, further comprising:
producing an unrealizability report if the test case sequence cannot be realized.

9. The method of claim 4, further comprising:
producing an indication of an unknown status when time or memory elapses before a determination of whether the test case sequence can be realized is made.

10. The method of claim 4, further comprising:
automatically generating and verifying the test vector sequence in a virtual environment before the test vector sequence is implemented on physical test equipment.

* * * * *